Feb. 2, 1926.
F. CONRAD
VOLT AMPERE METER
Filed Jan. 20, 1922
1,571,234
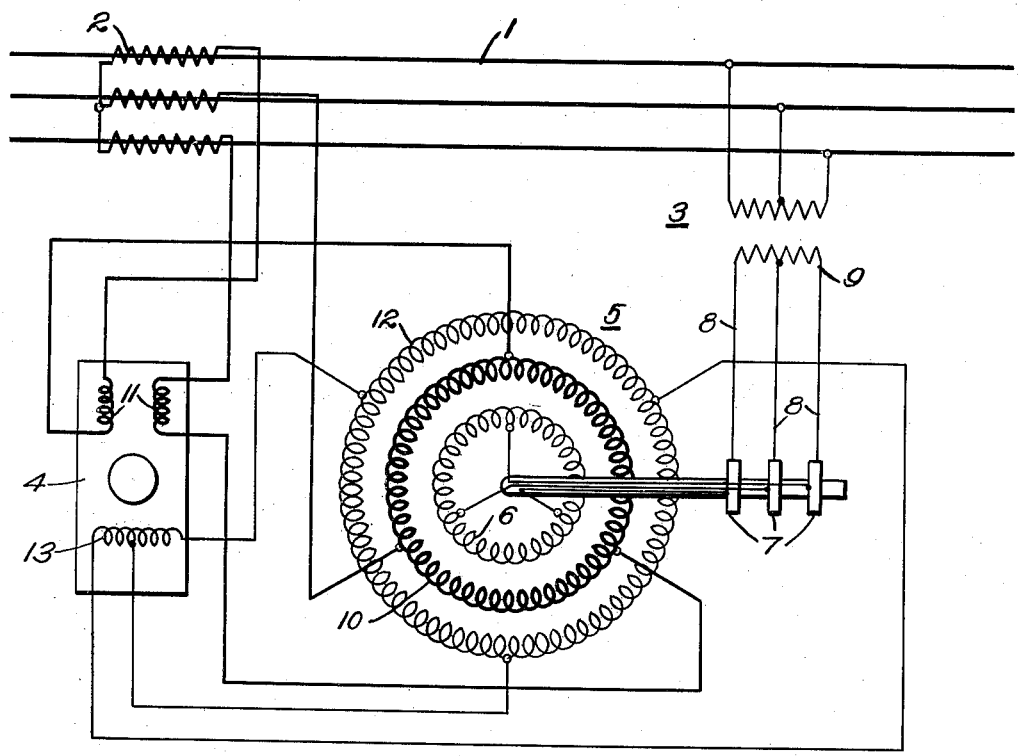
WITNESSES:
INVENTOR
Frank Conrad
BY
ATTORNEY Patented Feb. 2, 1926.

1,571,234

UNITED STATES PATENT OFFICE.

FRANK CONRAD, OF PITTSBURGH, PENNSYLVANIA, ASSIGNOR TO WESTINGHOUSE ELECTRIC & MANUFACTURING COMPANY, A CORPORATION OF PENNSYLVANIA.

VOLT-AMPERE METER.

Application filed January 20, 1922. Serial No. 530,572.

*To all whom it may concern:*

Be it known that I, FRANK CONRAD, a citizen of the United States, and a resident of Pittsburgh, in the county of Allegheny and State of Pennsylvania, have invented a new and useful Improvement in Volt-Ampere Meters, of which the following is a specification.

My invention relates to electrical measuring instruments and particularly to instruments for measuring the volt-amperes of alternating-current circuits.

One object of my invention is to provide an instrument of the above indicated character that shall accurately indicate the volt-amperes of a circuit, irrespective of changes in power factor.

Another object of my invention is to provide a volt-ampere meter that shall comprise few parts and that shall be compact in construction, economical to manufacture and effective in operation.

Heretofore, means have been suggested for measuring the volt-amperes of alternating-current circuits, but such means have usually been comparatively complicated in that they required relatively large numbers of parts and more or less complicated wiring systems.

In practicing my invention, I provide a single self-contained translating device or dynamo-electric machine, similar to an ordinary motor, that is so constructed or wound as to permit the interconnection of the device and an ordinary wattmeter to an alternating-current circuit to effectively measure the volt-amperes of the circuit in a simple and expeditious manner.

The single figure of the accompanying drawings is a diagrammatic view of a device embodying my invention.

My invention comprises, in general, an alternating-current circuit 1, shown as a three-phase circuit but which may suitably be of any number of phases, a current transformer or transformers 2, a voltage transformer 3, a meter 4, such as an ordinary polyphase wattmeter, and a motor or translating device 5. The device 5 comprises a movable element or winding 6 that is connected, through slip rings 7 and conductors 8, to the secondary winding 9 of the voltage transformer 3. A stationary element or winding 10 is connected, through the current element 11 of the meter 4, to the transformer or transformers 2. The device 5 is provided with a second stationary element or winding 12 that is connected to the voltage element 13 of the meter 4.

The movable element 6 and the stationary element 10 are constructed and related to each other, and to the circuit 1, to have fields, responsive to the voltage and the current respectively, of the circuit 1, that rotate in the same direction. This construction permits the element 6 to assume a balanced phase relation, or position of no torque, with respect to the stationary winding 10. Thus, if the phase relation between the current and the voltage of the circuit 1 should change in either direction, the winding 6 will immediately assume a position of no torque with respect to the winding 10, or a position indicative of the power factor of the circuit. The windings 6 and 12 being related to each other similarly to the primary and secondary windings, respectively, of a transformer, the winding 12 will be, at all times, energized in accordance with the voltage impressed on the circuit 1 with a definite phase relation with respect to the current traversing the circuit 1. Since the current element 11 of the meter 4 is energized in accordance with the current of the circuit 1, and the voltage element 13 thereof is energized from the winding 12 in accordance with the volts of the circuit 1 and in definite phase relationship with the current traversing the winding 11, the meter 4 will, at all times, accurately measure volt-amperes, irrespective of the power factor of the circuit 1.

The motor device 5, in actual practice, will be a relatively small self-contained device which, with a usual or standard type of watt meter, may be readily connected to a circuit.

While I have shown and described a particular form of my invention, changes and modifications may be made therein without departing from the spirit and scope of my invention, and such modifications are intended to be covered by the appended claims.

What I claim as my invention is:

1. The combination with a meter comprising an indicating element and a plurality of actuating elements therefor, one of which is adapted to be energized in accordance with one of the components of a quantity to be measured, of a translating device comprising a plurality of elements that are inductively related to be mutually affected in accordance with a quantity different from said first quantity and a tertiary element connected to another of said actuating meter elements and inductively affected by one of said other translating elements to energize said other actuating meter element in accordance with another component of said first quantity.

2. The combination with a meter comprising an indicating element and a plurality of actuating elements therefor, one of which is adapted to be energized in accordance with one of the components of the volt-amperes of a circuit, of a translating device comprising a plurality of elements that are inductively related to be mutually affected in accordance with the phase relation between the voltage and the current of the circuit and a tertiary element connected to another of said actuating meter elements and inductively affected by one of said other translating elements to energize said other actuating meter element in accordance with the other component of volt-amperes.

3. The combination with a meter having current and voltage elements, of a motor device embodying relatively movable inductively-related current and voltage windings and a winding inductively related to one of said windings and connected to one of said elements to supply the latter with current having a definite phase relation to the current traversing the other element.

4. The combination with a meter comprising a movable armature and a plurality of actuating windings therefor, one of which is adapted to be energized in accordance with one of the components of the volt-amperes of a circuit, of a translating device comprising current and voltage coils that are inductively related and adapted to move relatively in accordance with the phase relation between the voltage and the current of the circuit, and a tertiary coil that is connected to another of said actuating meter windings and inductively related to one of said other coils to energize said other actuating meter winding in accordance with the other component of volt-amperes.

5. The combination with a meter having current and voltage elements, of a motor device comprising relatively movable elements having fields, respectively, responsive to the current and the voltage of a circuit rotating in the same direction, and an element inductively affected by one of said motor elements, connected to one of the meter elements.

6. The combination with a meter having current and voltage elements, of a motor device comprising a movable element energized in accordance with the voltage of a circuit, a stationary element inductively related to said first element and connected to the circuit through the current element of the meter and a second stationary element inductively related to said voltage element and connected to the voltage element of the meter.

7. The combination with an alternating-current circuit, of a single translating device comprising two relatively movable elements, having fields responsive to the voltage and the current of said circuit rotating in the same direction to take up a no-torque balanced phase relation in response to any phase relation between the voltage and current of the circuit, and an element inductively related to one of said first elements and energized in response to relative movement of said elements for transmitting current in phase with one of the volt-ampere components of the circuit.

8. The combination with an alternating-current circuit and an electro-responsive device, of a single self-contained translating device comprising mutually inductive current and voltage elements and a tertiary element inductively affected by one of said first elements to have a current induced therein in predetermined phase relation to the current in the other of said first elements irrespective of the power factor of the circuit, and a circuit connecting the electro-responsive device to said tertiary element.

9. The combination with an alternating-current circuit and an electro-responsive device, of a single self-contained translating device comprising mutually inductive current and voltage elements automatically adjustable in response to power-factor changes to effect a constant phase-angle relation therebetween and a tertiary element connected in circuit with said electro-responsive device and inductively energized by one of said first elements.

10. The combination with a meter including co-operating elements one of which is adapted to be energized in accordance with one quantity of an alternating-current circuit, of a separate single self-contained translating device including only one set of relatively movable inductively related elements automatically relatively adjustable in accordance with changes in another quantity of said circuit, said device being adapted to supply current to another of said meter elements having a definite phase relation to the current in said one meter element.

In testimony whereof, I have hereunto subscribed my name this 4th day of January 1922.

FRANK CONRAD.